No. 718,655. PATENTED JAN. 20, 1903.
W. D. QUIGLEY & J. H. GAY.
LEATHER SPLITTING MACHINE.
APPLICATION FILED FEB. 3, 1902.
NO MODEL. 12 SHEETS—SHEET 1.

No. 718,655. PATENTED JAN. 20, 1903.
W. D. QUIGLEY & J. H. GAY.
LEATHER SPLITTING MACHINE.
APPLICATION FILED FEB. 3, 1902.
NO MODEL. 12 SHEETS—SHEET 3.

WITNESSES:
Gustave Dieterich
E. H. Dieterich

INVENTORS
Joseph H. Gay
William D. Quigley
BY
Paul Benjamin
their ATTORNEY

No. 718,655. PATENTED JAN. 20, 1903.
W. D. QUIGLEY & J. H. GAY.
LEATHER SPLITTING MACHINE.
APPLICATION FILED FEB. 3, 1902.
NO MODEL. 12 SHEETS—SHEET 4.

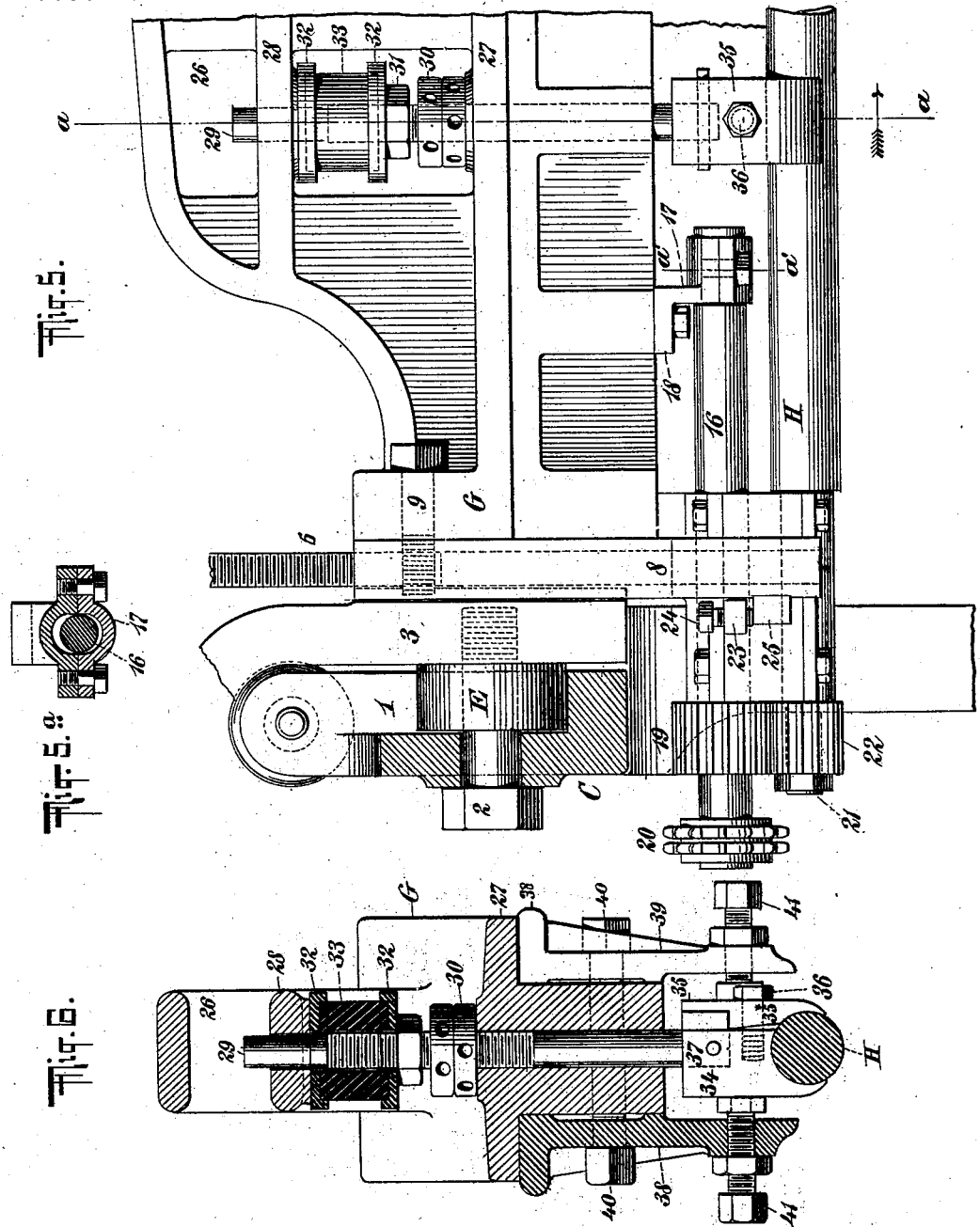

No. 718,655. PATENTED JAN. 20, 1903.
W. D. QUIGLEY & J. H. GAY.
LEATHER SPLITTING MACHINE.
APPLICATION FILED FEB. 3, 1902.
NO MODEL. 12 SHEETS—SHEET 6.

WITNESSES
INVENTORS
Joseph H. Gay
William D. Quigley
BY
ATTORNEY

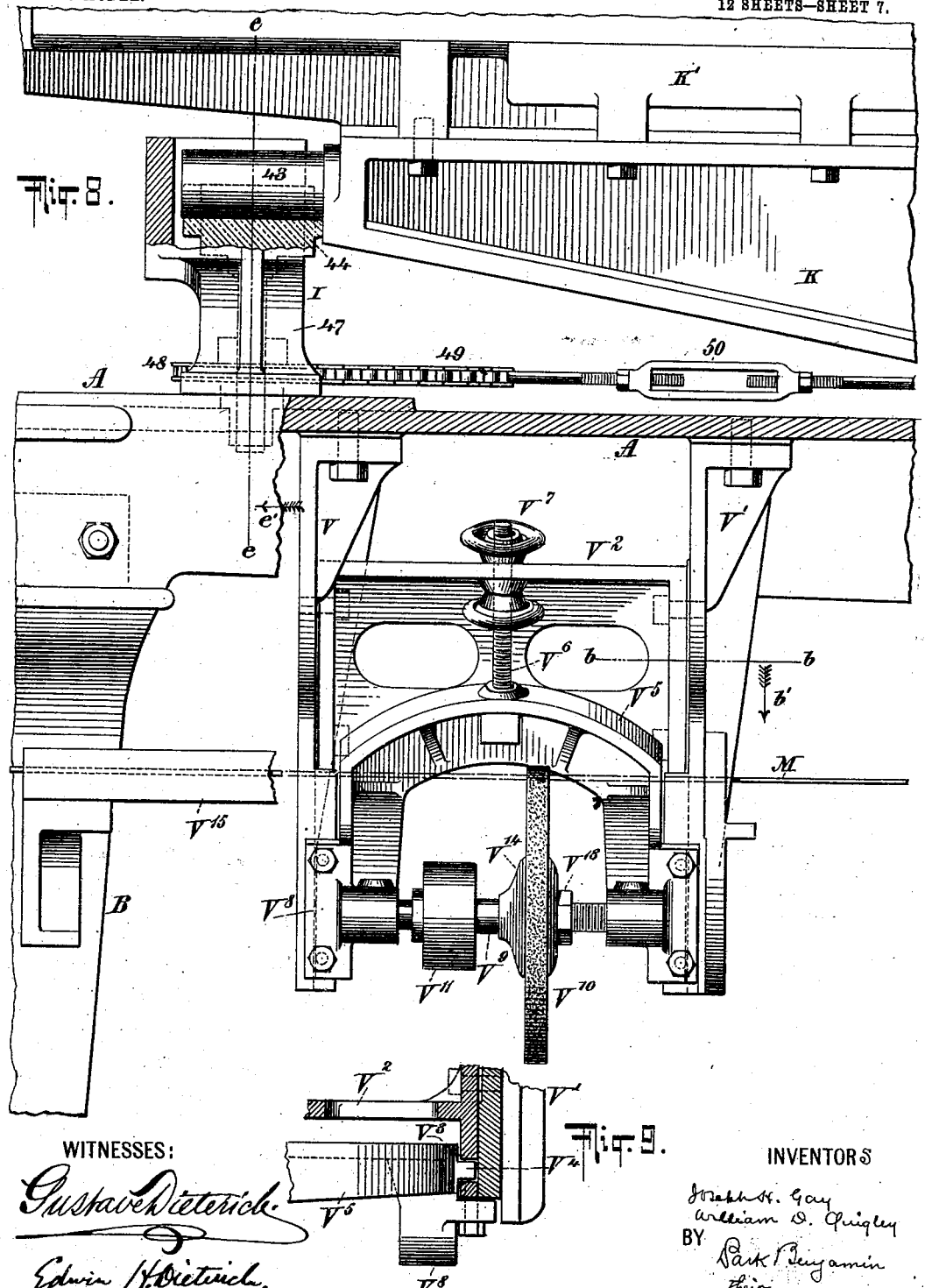

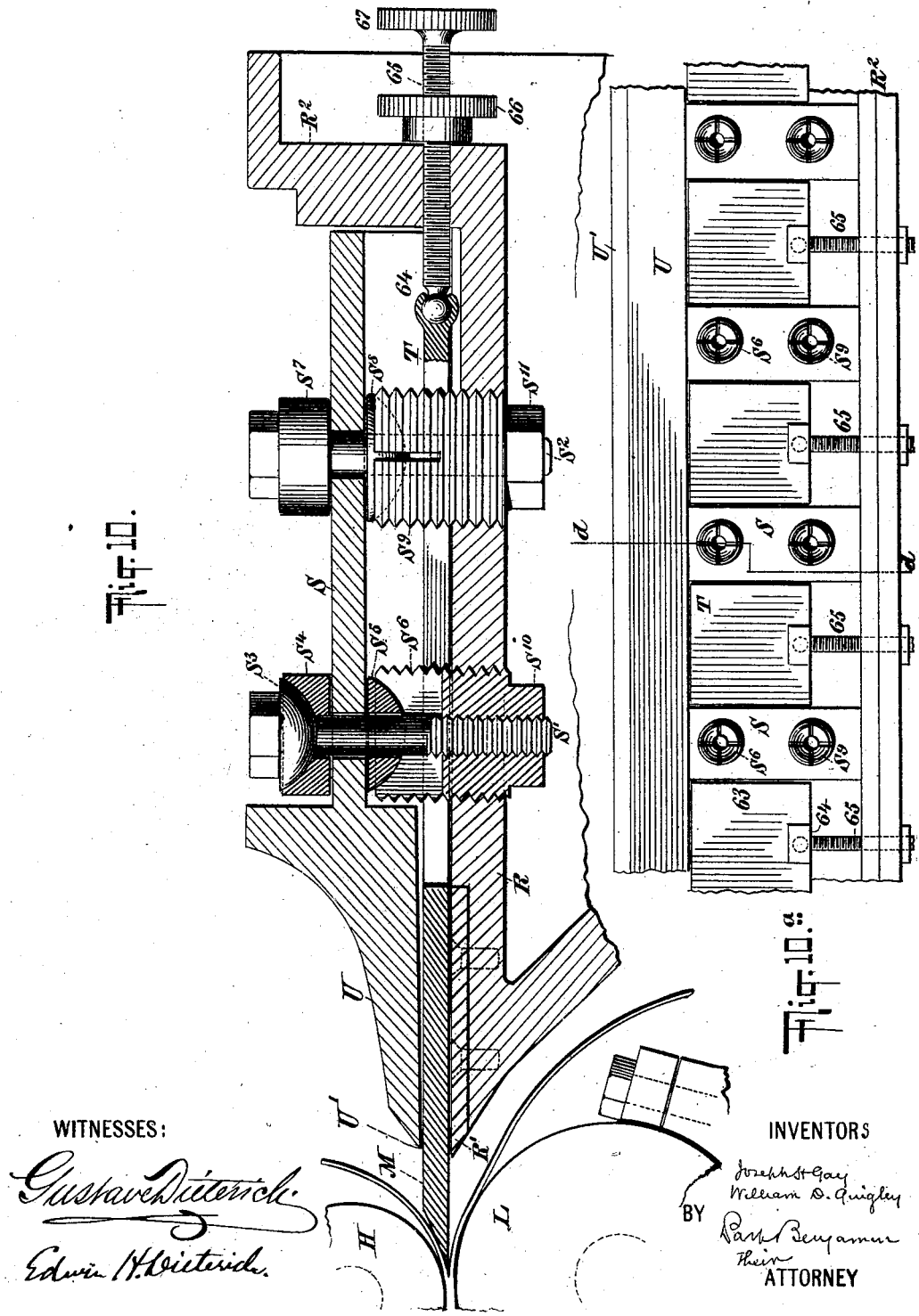

No. 718,655. PATENTED JAN. 20, 1903.
W. D. QUIGLEY & J. H. GAY.
LEATHER SPLITTING MACHINE.
APPLICATION FILED FEB. 3, 1902.
NO MODEL. 12 SHEETS—SHEET 9.

WITNESSES:
Gustave Dieterich
Edwin H. Dieterich

INVENTORS
Joseph H. Gay
William D. Quigley
BY Parker Benjamin
Their ATTORNEY

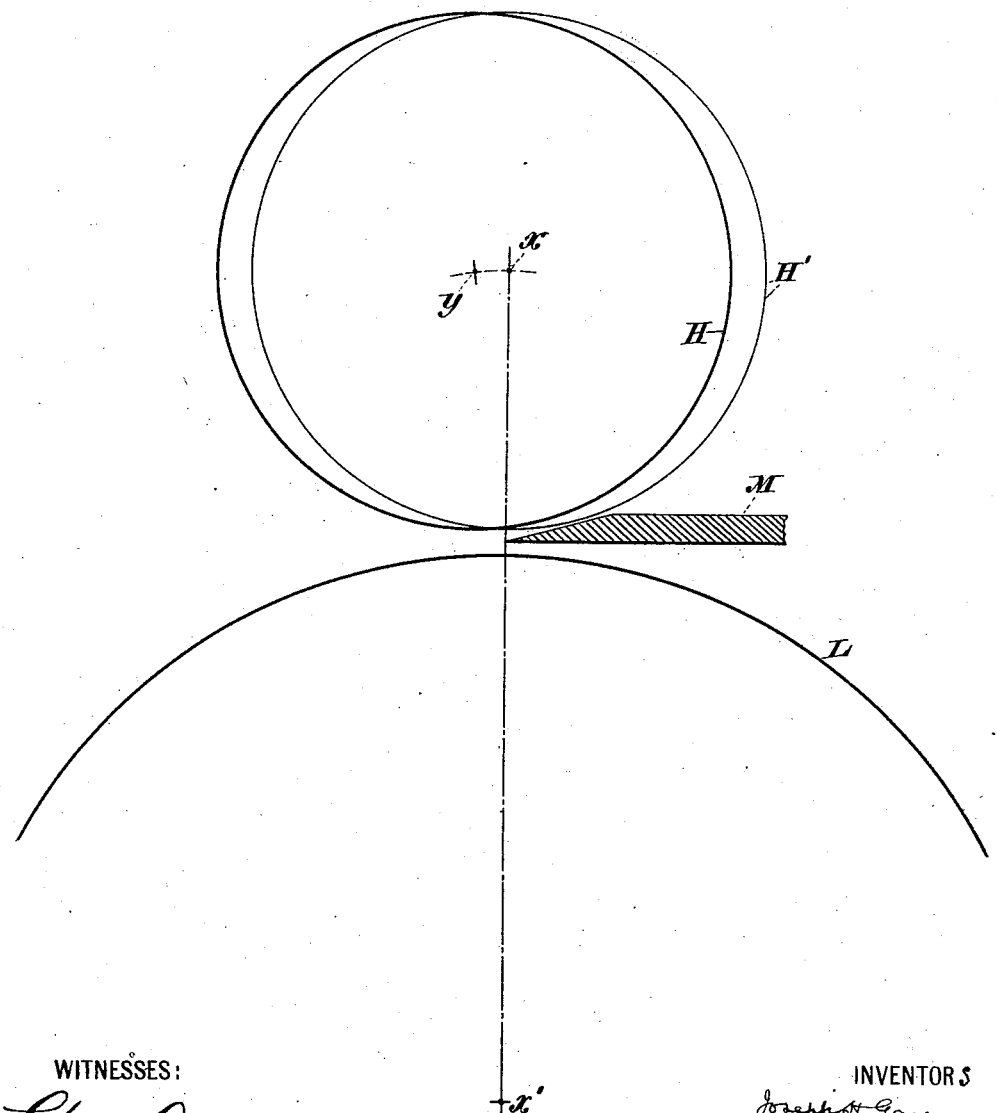

No. 718,655. PATENTED JAN. 20, 1903.
W. D. QUIGLEY & J. H. GAY.
LEATHER SPLITTING MACHINE.
APPLICATION FILED FEB. 3, 1902.
NO MODEL. 12 SHEETS—SHEET 11.
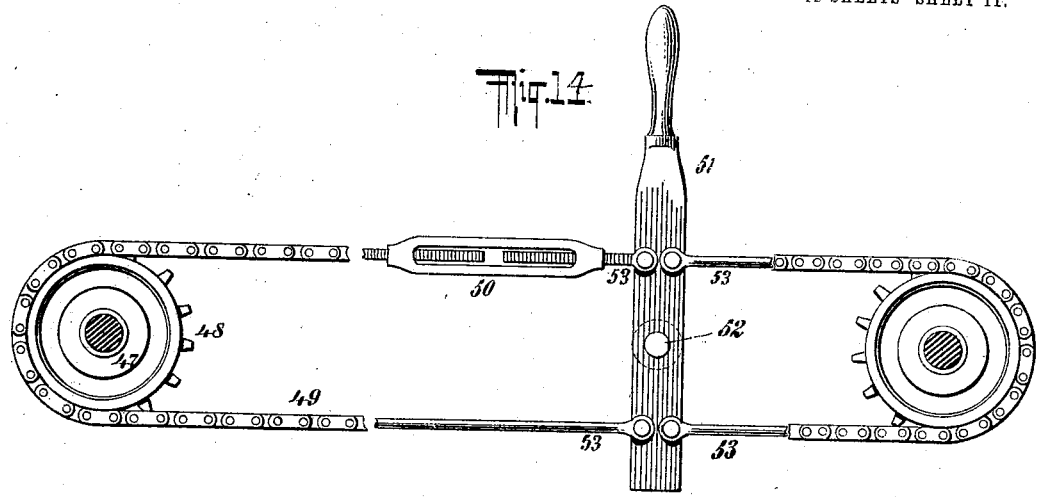
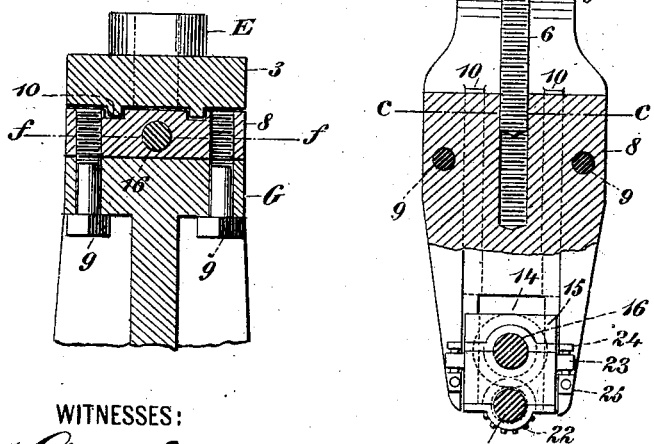
WITNESSES:
INVENTORS
Joseph H. Gay
William D. Quigley
BY Park Benjamin
Their
ATTORNEY No. 718,655. PATENTED JAN. 20, 1903.
W. D. QUIGLEY & J. H. GAY.
LEATHER SPLITTING MACHINE.
APPLICATION FILED FEB. 3, 1902.
NO MODEL. 12 SHEETS—SHEET 12.
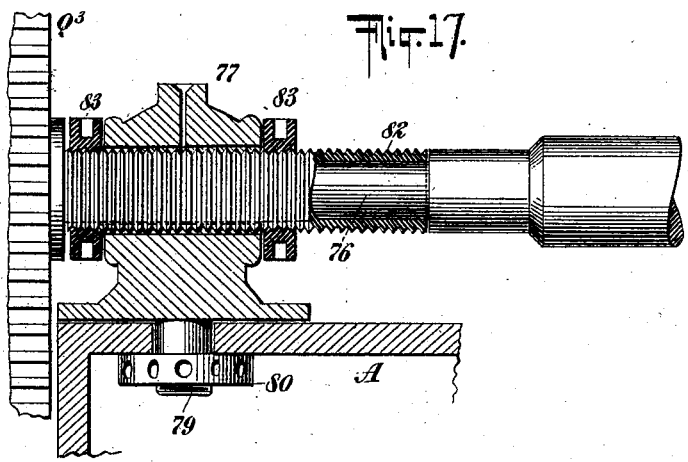
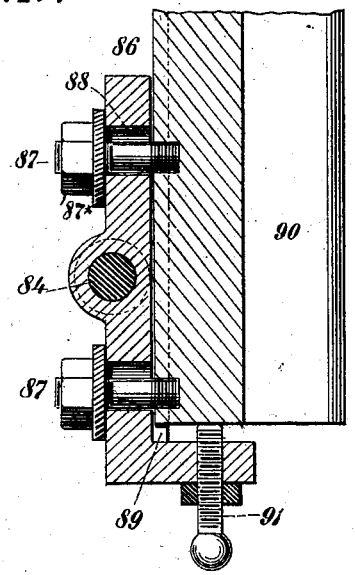
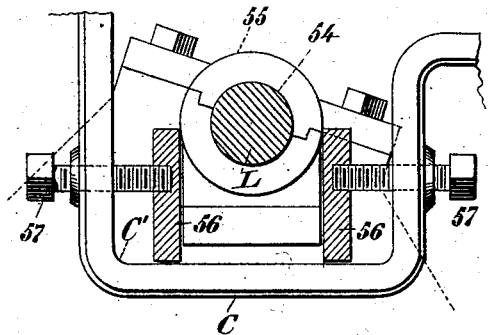
WITNESSES:
INVENTORS
Joseph H. Gay
William D. Quigley
BY
Park Benjamin
Their ATTORNEY

UNITED STATES PATENT OFFICE.

WILLIAM D. QUIGLEY AND JOSEPH H. GAY, OF NEWARK, NEW JERSEY.

LEATHER-SPLITTING MACHINE.

SPECIFICATION forming part of Letters Patent No. 718,655, dated January 20, 1903.

Application filed February 3, 1902. Serial No. 92,449. (No model.)

*To all whom it may concern:*

Be it known that we, WILLIAM D. QUIGLEY and JOSEPH H. GAY, citizens of the United States, and residents of Newark, Essex county, New Jersey, have invented a new and useful Improvement in Leather-Splitting Machines, of which the following is a specification.

Our invention relates to a machine for splitting skins or hides.

Our invention consists in the combination of drawing-in rolls and knife, so that said knife will have its cutting edge located at the place of maximum compression of said work between said rolls and so that said rolls will be disposed with their circumferential surfaces at a distance from the knife-surfaces to afford clearance for the passage of the split material in the construction of the machine and the various combinations and adjustments of its parts, all as more particularly pointed out in the claims.

Figure 1:
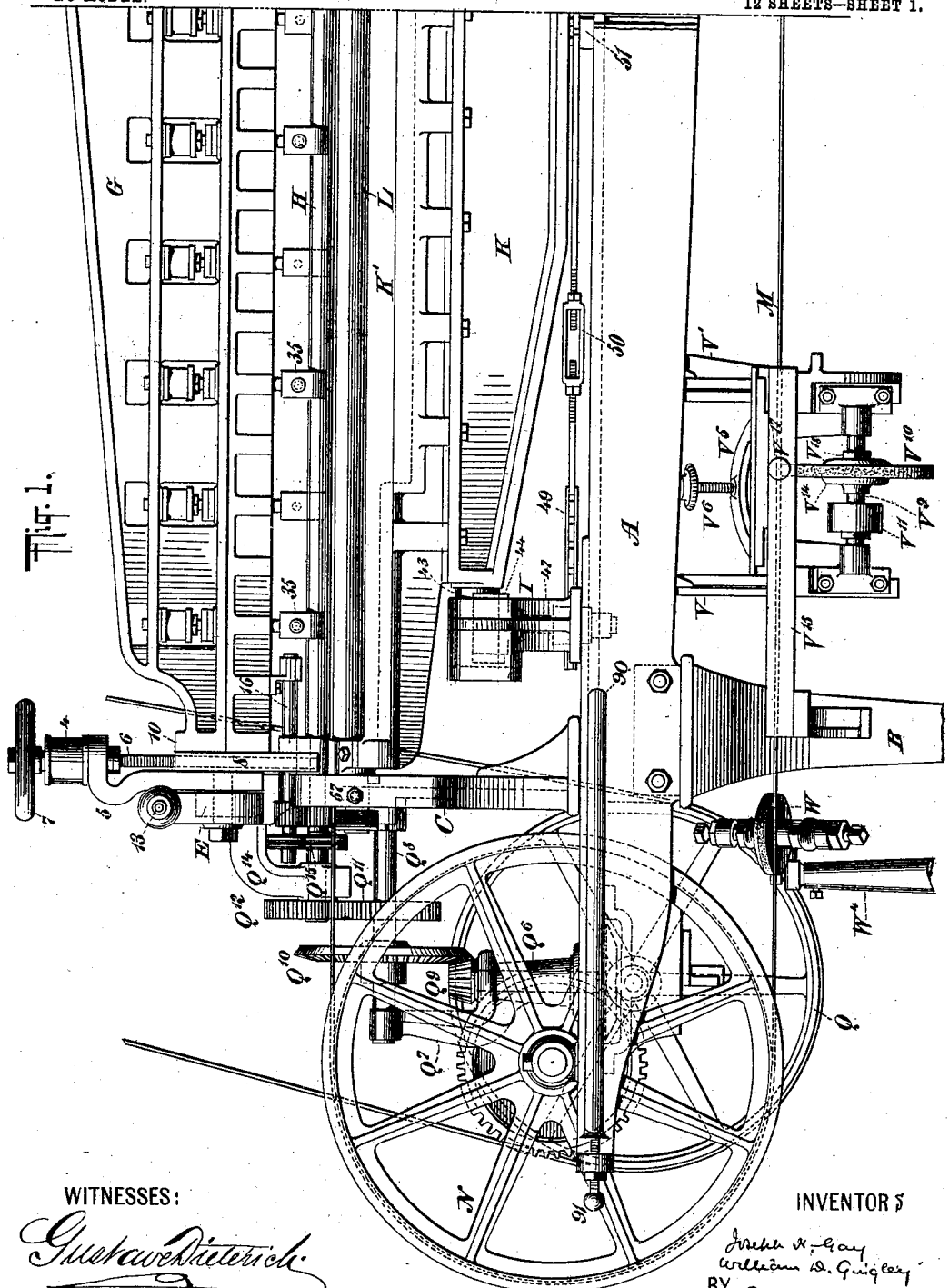
Figure 2:
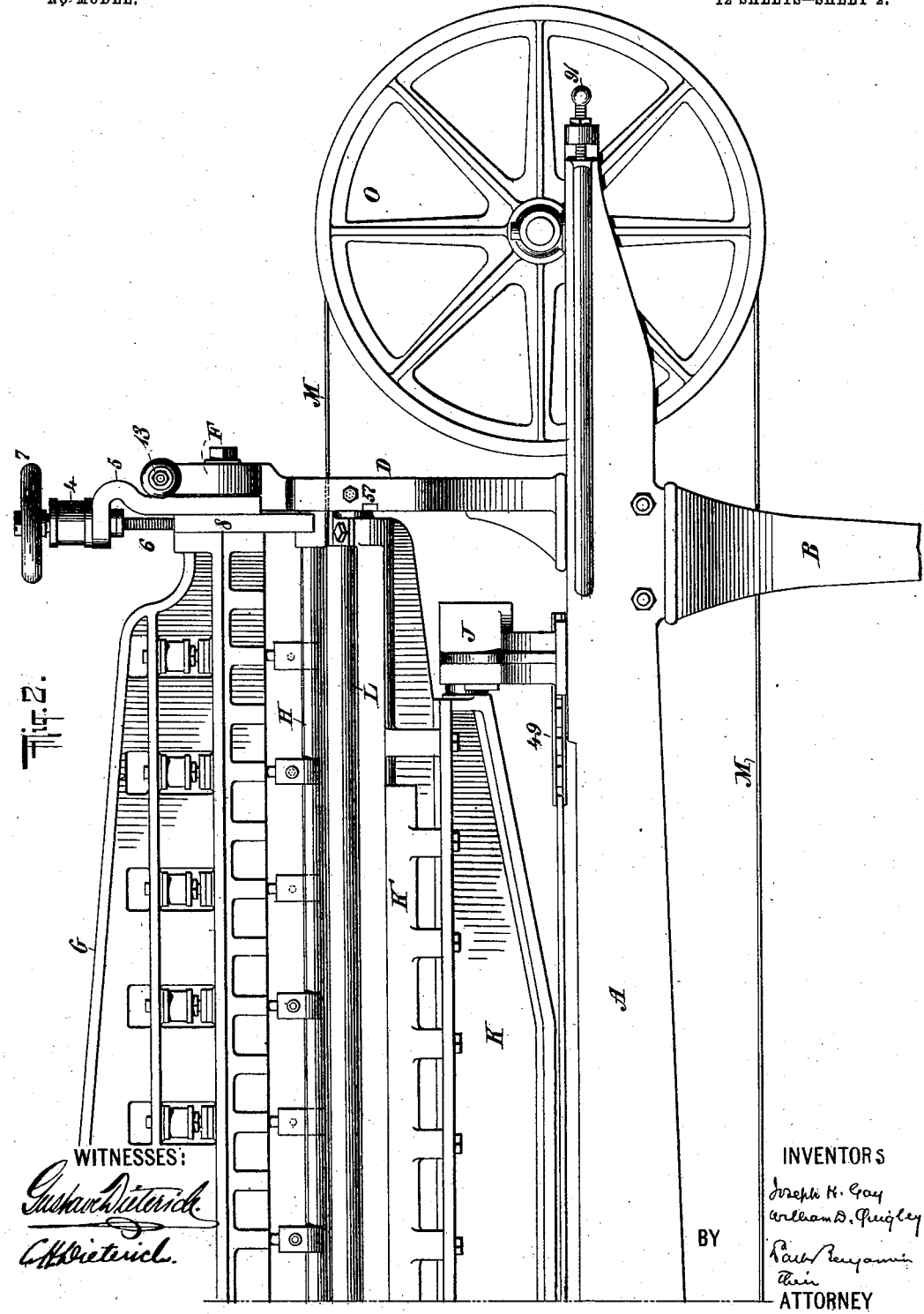
Figure 3:
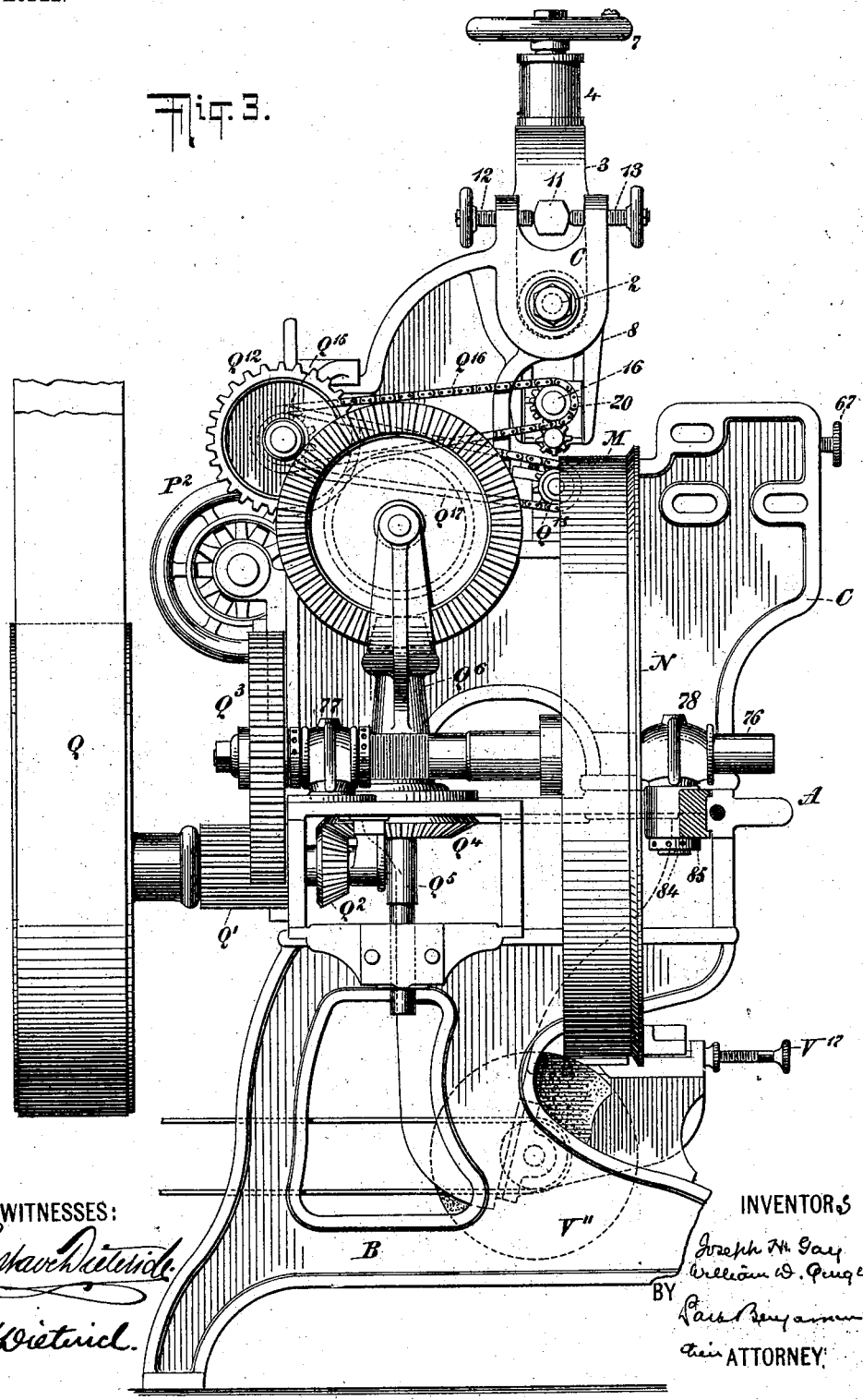
Figure 4:
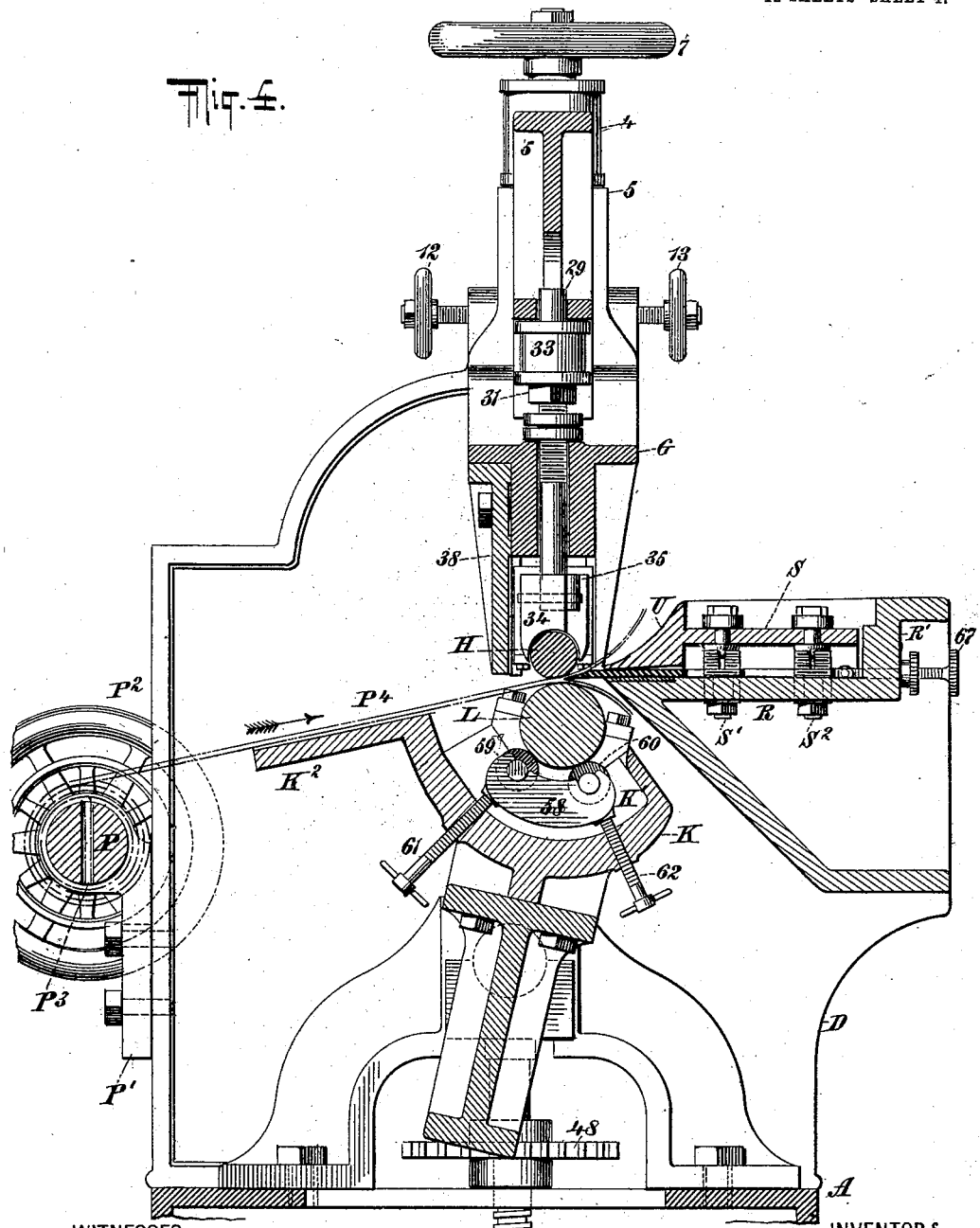
Figure 7:
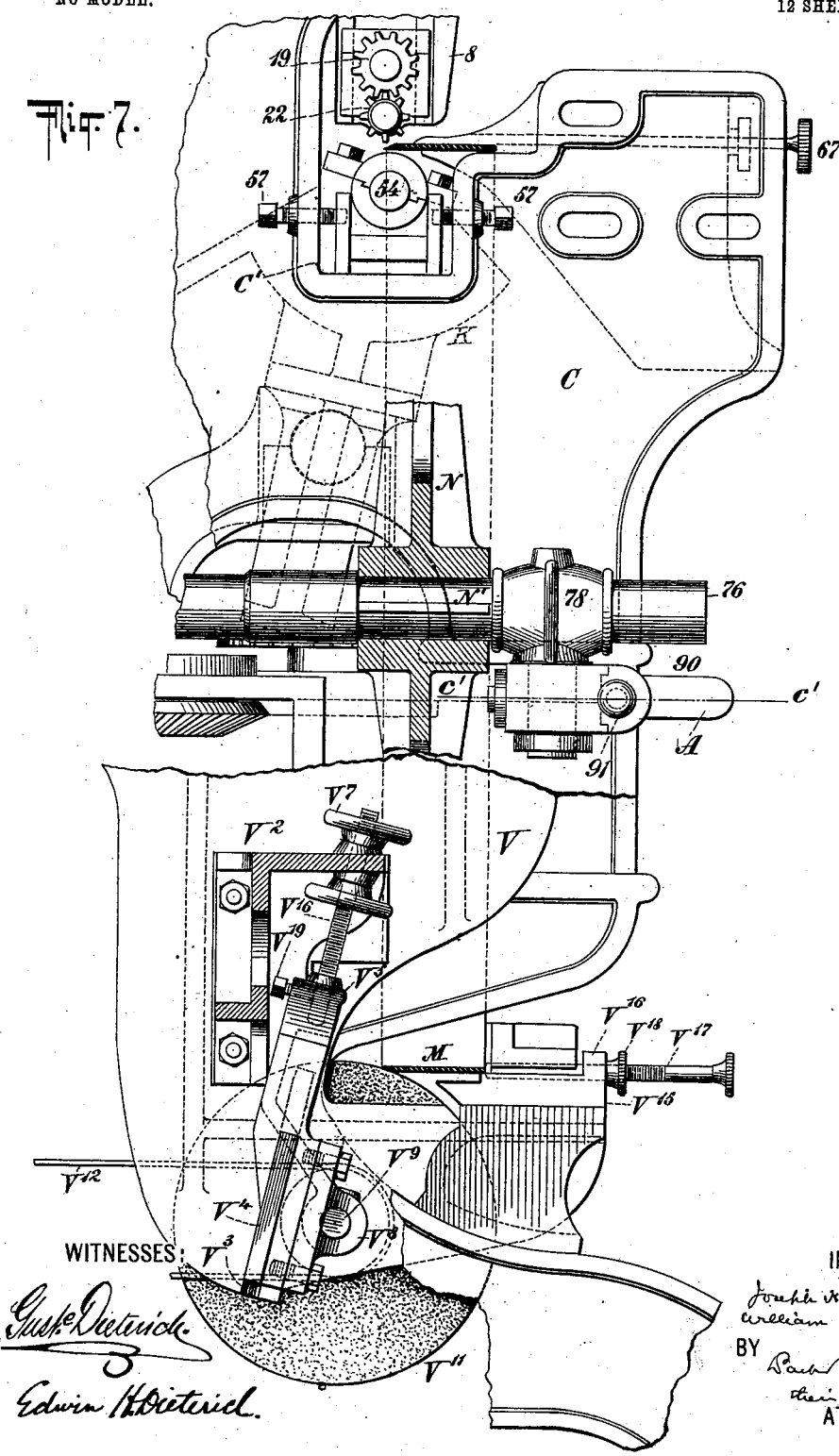
Figure 11:
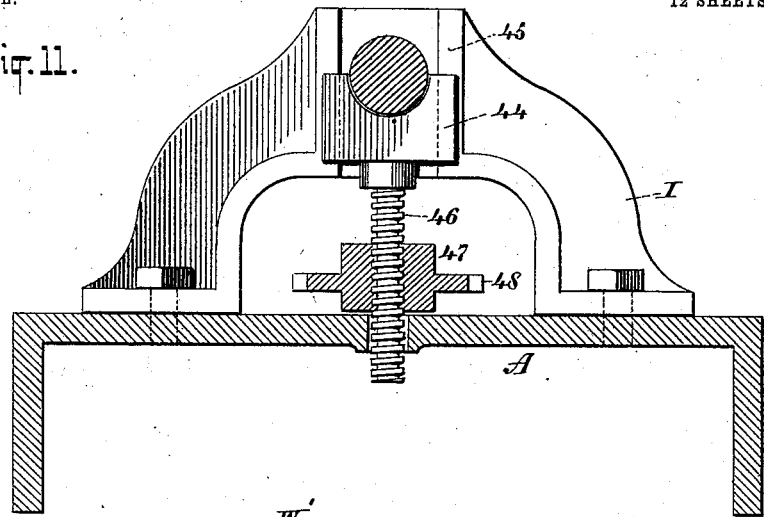
Figure 12:
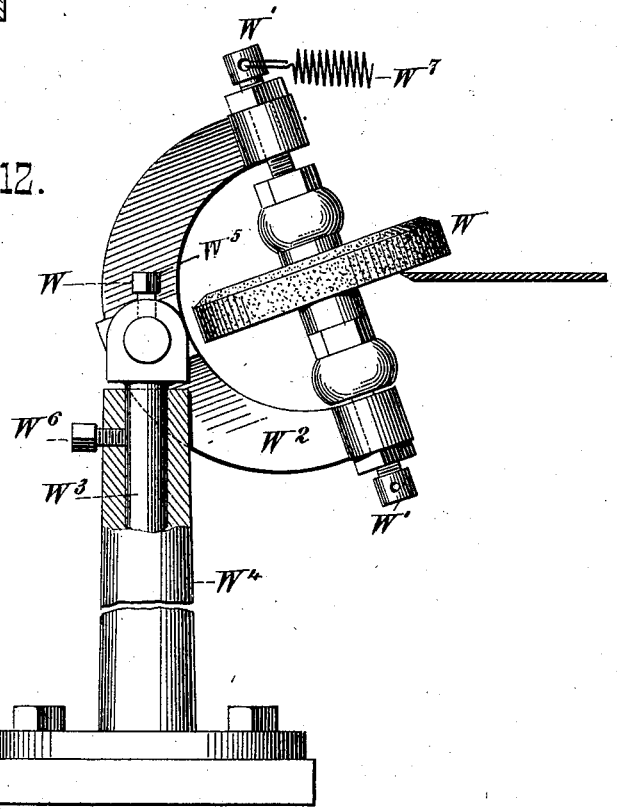

In the accompanying drawings, Figure 1 is a side elevation showing the left-hand end, and Fig. 2 a side elevation showing the right-hand end, of the machine. The two drawings placed together form an elevation of the entire machine. Fig. 3 is an end elevation. Fig. 4 is a vertical transverse section of the portions of the machine which are above the supporting-table. Fig. 5 is an enlarged detail view of the upper part of the left-hand end of the machine. Fig. 5$^a$ is a section on the line $a'$ $a'$ of Fig. 5. Fig. 6 is a section on the line $a$ $a$ of Fig. 5, taken in the direction of the arrow. Fig. 7 is an enlarged detail view of a portion of the left-hand end of the machine in elevation with parts broken away to show the construction. Fig. 8 is an enlarged detail view of a portion of the machine in side elevation with parts broken away to show the knife-grinding mechanism. Fig. 9 is a section on the line $b$ $b$ of Fig. 8, taken in the direction of the arrows $b'$. Fig. 10 is an enlarged cross-section on the line $d$ $d$ of Fig. 10$^a$ of the knife-supporting bed, knife-holding bar, and adjusting devices. Fig. 10$^a$ is a partial plan view of the same with the knife-holding bar and bolts S' S$^2$ removed. Fig. 11 is a detail cross-section in the direction of the arrow $e'$ on the line $e$ $e$ of Fig. 8, showing the device for raising and lowering the lower frame K. Fig. 12 is a side elevation of the steel disk and its support. Fig. 13 is a diagram illustrative of the setting of the rolls and knife. Fig. 14 shows the means for operating the raising and lowering devices for the frame K represented in Fig. 11. Fig. 15 is an enlarged detail in cross-section on the line $ff$ of Fig. 16, showing the device for raising and lowering the frame G. Fig. 16 is a section of the same on the line $c$ $c$ of Fig. 15. Fig. 17 is an enlarged detail showing the bearing 77 and knife-pulley shaft 76. Fig. 18 is a horizontal section on the line $c'$ $c'$ of Fig. 7, showing the means for adjusting the position of the other bearing of said pulley-shaft. Fig. 19 is an enlarged end view of the device for adjusting the position of the lower frame K when swung on its journals, the plates 56 and shaft L being in section.

Similar numbers and letters of reference indicate like parts.

In order that the construction may be more readily understood, we will first describe the general relations of the principal parts and afterward the details.

A is the table, supported upon legs B. It carries two side frames C D. Between the side frames is the truss-frame G, which carries the upper or spring roll H and swings on trunnions E F. On the table A are two standards I J, in which is journaled at its upper ends the lower truss-frame K, which carries the guide-roll L. The knife is an endless band M, which passes over the wheels N O, journaled at the ends of the table, which wheels are rotated. The knife is placed so that its edge comes between the rollers H L.

In order to present the hide P$^4$ to the operation of the machine, it is rolled upon a beam P, dotted lines, Fig. 4. This beam is supported in brackets P', secured to the end frames C D, and is rotated by the hand-wheel P$^2$. One edge of the hide is inserted through the transverse slot P$^3$ in beam P, and then by means of the wheel P$^2$ said beam is revolved, thus winding the hide upon it. The free end of the hide is then introduced between the rollers H L and is carried on by the rotation thereof, so that its advancing edge meets the edge of the moving knife-blade M and is so split as it is gradually unwound from the freely-turning beam.

The main driving-pulley Q, Fig. 3, is on a short shaft which carries a straight pinion Q' and a beveled pinion Q². Pinion Q' through intermediate gearing actuates the knife-carrying wheel N, and so moves the band-knife. Pinion Q² also through intermediate gearing rotates the rolls H L.

*The spring-roll-carrying frame G.*—This frame is supported in the following manner: As the parts to be described are the same at each end of the frame, a description of one arrangement will suffice for both.

Referring to Figs. 5, 5ª, 6, 15, and 16, in the fixed side frame C is a recess 1, Fig. 5, the lower portion of which is semicircular to form a seat for the trunnion E. A headed pin 2 passes through the side frame C and secures the trunnion E to the bar 3, which, as shown at 5, Fig. 1, is bent over horizontally at its upper end. Through the bar 3, as best shown in Fig. 15, passes the screw 6. At the upper end of screw 6 is secured the hand-wheel 7, the hub of which rests upon a steel block 4, interposed between said hub and the bent-over portion 5 of bar 3. The weight of frame G thus comes upon the block 4 at each end of said frame. The bars 3 in turn are supported upon the trunnions E. It is obvious that the frame G can swing through the rotation of the trunnions E in their seats. By suitably turning the hand-wheel 7 to rotate screw 6 the end of the frame G can be raised or lowered, and of course by operating the wheels 7 at both ends of the machine the frame G can be bodily raised and lowered. In order to retain the frame G in the angular position in which it may be placed through its turning upon its trunnions E F, we provide upon each bar 3 a projecting stud 11, Fig. 3. The upper ends of the frames C D form a yoke, between the arms of which the studs 11 enter and through the arms of which pass the adjusting-screws 12 and 13, which bear upon the opposite sides of studs 11. By suitably turning the screws 12 and 13 the frame G may be swung and adjusted upon its trunnions E.

*The spring or upper roll H.*—In the lower end of bar 3, Fig. 15, is a recess 14, which receives the sliding double bearing 15. This recess has grooves in its vertical sides to receive the edges of the bearing 15, so that it has guided vertical play in said recess. Through the upper portion of bearing 15 extends the short shaft 16, Fig. 5. One end of shaft 16 is received in the bearing 17, Fig. 5ª, which is carried by the bracket 18 on the lower side of frame G. As shown in Fig. 5ª, this bearing is made large enough to permit said shaft 16 to have some vertical play. On the other side of bearing 15 said shaft 16 carries a gear-wheel 19 and a sprocket-wheel 20. Passing through the lower part of the bearing 15 is the shaft 21 of roll H, and this shaft carries gear-wheel 22, which engages with gear-wheel 19. At the opposite end of the machine, Fig. 2, the bar 3 carries a bearing for the reception of the end of shaft 21 of roll H. In order to adjust the double bearing 15 vertically in the recess 14, said bearing is provided with lugs 23, through which pass set-screws 24, which screws bear upon projections 25 on the block 8. (See Figs. 5 and 15.) This adjustment of the bearing 15 will, however, be small and will be sufficiently permitted by the play of shaft 16 in its bearing 17, as shown in Fig. 5ª.

*The steadying and alining devices for the roll H.*—From Figs. 1 and 2 it will be seen that in the frame G are a number of openings, one of which is shown at 26, Fig. 5. Below each opening is a broad bearing-surface 27, and crossing each opening is a parallel rib 28. Extending through the rib 28 and body portion of frame G below 27 is a vertical rod 29. This rod is threaded to receive the capstan-nuts 30, the lower of which rests on surface 27. Above said nuts is a fixed nut 31, and above nut 31 are disks 32, between which disks is interposed an elastic block 33. The rod 29 carries at its end a bearing-block, which is composed of two pieces 34 35, Fig. 6. The inner face of part 35 is beveled, as shown at 35*, and in the lower side of both parts are concavities, which form a recess, in which the roll H is received. The part 34 is secured to rod 29 by the pin 37. A bolt 36 connects part 35 to part 34 and also serves to bring the inclined face of part 35 nearer to or farther from the opposite face of part 34. In this way the size of the concave recess is altered to take up frictional wear and to compress the parts 34 35 more or less upon roll H. By suitable adjustment of the capstan-nuts 30 and nuts 31 the rod 29, and hence the bearing-block 34 35, can be raised or lowered, so as in this way to control its pressure in a vertical direction upon the roll H. On each side of the frame G and below the broad surface 27 are secured alternating cheek-pieces 38, Fig. 6. These pieces are omitted in Fig. 5 and also in Figs. 1 and 2 for the sake of clearness. They are secured in place by bolts 40, and they come opposite to the bearing-blocks 34 35. Through the lower end of each cheek-piece passes an adjusting-screw 41. The object of the adjusting-screws 41 is to adjust the bearing-blocks in a lateral direction and hold them rigid, so as to prevent lateral deviation when the machine is in use. As will be apparent from Figs. 1 and 2, there are a plurality of these bearing-blocks supported in the manner already described and receiving the roll H at intervals along its length. By the adjustment of these blocks they can be caused to press upon the roll H vertically or laterally, and thus maintain it in a true line, or to act upon said spring-roll so as to cause the hide passing between it and the lower roll to be subjected to varying degrees of compression, or to modify the interval between the rolls at desired points to suit varying thicknesses of the hide.

The object of the elastic cushion 33 is to permit a certain yielding of the spring-roll H upward in case of an undue increase in thickness of the hide at any given point or the carrying of some obstruction through the rolls requiring such yielding.

*Adjustments of roll H.*—From what has so far been explained the following facts will now be obvious:

First. The frame G can be adjusted vertically by means of the hand-wheel 7, carrying with it the roll H.

Second. The frame G, and hence the roll H, can be adjusted in an arc through the swinging of the frame upon its trunnions E F by means of the screws 12 13.

Third. The roll H can be alined and held in true line by means of the bearing-blocks 34 35 and the adjusting devices therefor. A vertical adjustment of the roll H can be obtained independently of the movement of the frame G by means of its sliding bearings 15 and the adjusting devices 23 24 25.

Fourth. In case of an obstruction coming between the rolls H L caused from undue thickness of the hide or any other cause requiring the interval between these rolls to be temporarily increased the roll H will yield upwardly at its bearings through the free sliding of the latter in the recess 14 and also by the upward buckling of that portion of the roll at which the obstacle or increased thickness occurs, through the yielding of the bearing-block at the point, this yielding being permitted by the elastic cushion 33.

Fifth. Because the blocks 34 35 receive and embrace the roll H in their concavity said roll by reason of its spring can be drawn upwardly or forced downwardly at the points embraced by said blocks by raising or lowering the rods 29.

*The gage or lower roll L.*— As already stated, this is supported in the truss-frame K. The journals of this frame, one of which is shown at 43, Fig. 8, rest upon bearings 44, Figs. 8 and 11, which are capable of sliding vertically and are provided with side grooves to receive the ribs 45, Fig. 11, in the supporting-standard. On the lower side of bearings 44 are screws 46, which pass through the table A and are provided with a nut 47, carrying a sprocket-wheel 48. The same arrangement is at the opposite end of the frame K, and the two sprocket-wheels are connected by a chain belt 49, provided with turnbuckle 50 for tightening it.

For the purpose of actuating the sprocket-wheels 48, and hence the screws 46, to raise or lower the bearings a hand-lever 51 is provided, which is pivoted, as shown at 52, Fig. 14, on the upper side of the table A. The belt is divided to give four ends, Fig. 14, preferably terminating in eye-bars, as 53, which are pivoted to said lever 51 on each side of the fulcrum. It will be obvious that in swinging the lever by its handle in one direction or the other the wheels 48 are correspondingly turned, the screws 46 thus rotated, and so the bearings 44 are raised or lowered simultaneously, thus raising or lowering bodily the frame K.

*Adjustment of frame K on its journals.*— The gage-roll L has the ends of its shaft 54 supported in bearings 55, Fig. 19, and these bearings extend in a longitudinal direction into recesses C', formed in the side frames C D, Figs. 7 and 19. In recess C', on each side of the bearing 55, are plates 56, which receive the adjusting-screws 57, which pass through the flanges in the frame. By adjusting the screws 57 the frame K can be set in desired angular position, turning upon its journals.

*Supporting and alining devices for roll L.*— The shape of the upper portion of the frame K is shown in cross-section in Fig. 4 It is provided with a long trough K', extending under the roll, in which trough are disposed a number of carriers, one of which is shown at 58, Fig. 4. In each of these carriers is journaled a pair of loose rolls 59 60, upon which the gage-roll L rests. Each carrier 58 is supported by two adjusting-screws 61 62, which pass through the solid portion of the frame K, as shown in Fig. 4. Any number of these carriers 58 may be used as may be desired, and upon the number employed their lengths will depend. For this reason, as well as for the sake of clearness, they are not shown in any of the drawings except Fig. 4. The function of the carriers 58, with the rolls 59 60, is to support the gage-roll L from below and also by suitable setting of the screws 61 62 to aline said roll. The frame K at its upper portion has an inclined portion $K^2$, which supports the hide $P^4$ between the rolls and the beam P.

*Adjustments of gage-roll L.*—From what has been described with reference to the frame K and roll L the following will now appear:

First. By means of the hand-lever 51, actuating the screw 46, the frame K may be raised and lowered bodily, carrying with it the roll L, which is thus vertically adjusted.

Second. The frame K can be swung upon its journals, thus adjusting roll L in an arc. The frame is retained in desired position by means of the adjusting-screws 57, Fig 19.

Third. The roll L can be adjusted for alinement by means of its supporting-carriers 58 and their adjusting-screws 61 62.

*The knife and its adjustments,* (see Figs. 4, 10, and $10^a$.)—Extending between the side frames C D is a shelf R, above which travels the knife M. On the forward edge of the shelf and just below the knife is secured a steel wearing-plate R'. On the rear side of the shelf R there is a flange $R^2$. Above the plate R is the knife-steadying bar U, which extends above the knife and is provided with projecting arms S, which extend rearwardly to the flange $R^2$ of the shelf R. These arms S alternate along the shelf with the knife-adjusting devices T.

*Knife-adjusting devices.*—The knife-adjusting devices T are all alike and are constructed as follows: In each there is a plate 63, which rests at one edge against the back of the knife M and has a universal joint 64 on its opposite edge, with which joint is connected the set-screw 65, which passes through the flange $R^2$ of shelf R. Screw 65 has a jam-nut 66 and also a milled head or hand-wheel 67 for operating it. By turning the hand-wheel 67 in one direction or the other the plate 63 is forced against the back of the knife M to move the edge of the knife toward the rolls, or if the plate 63 is retracted the knife M is free to be pushed rearwardly by the action of the advancing edge of the hide. By adjusting the several hand-wheels 67 and screws 65 the knife can be alined as desired.

*Adjustment of the knife-steadying bar U.*—Through each arm S pass two headed bolts $S'$ $S^2$. The bolt $S'$ below its head has a flange $S^3$ convex on its under side, which is received in a concave washer $S^4$. Surrounding the bolt below the arm S is a convex washer $S^5$, which rests in the concavity of a split screw $S^6$. Said screw $S^6$ receives the threaded portion of the bolt $S'$ and is itself received in the shelf R. The bolt $S^2$ has a convex flange similar to $S^3$, resting in the cup $S^7$, and convex washer $S^8$, similar to $S^5$, which is received in the concavity of the split screw $S^9$, similar to $S^6$. The split screws $S^6$ and $S^9$ have squared heads $S^{10}$ and $S^{11}$. The adjustment is effected in the following manner: The bolts $S'$ and $S^2$ are loosened. The split screw $S^9$ is rotated by means of its head $S^{11}$ to tilt the bar U so that the outer edge $U'$ is brought into contact with the knife. The bolt $S^2$ is then locked so that its several parts are compressed together by turning its upper squared head. The split screw $S^6$ is then raised, so as to move the edge $U'$ just clear of the knife. Then the bolt $S'$ is locked by turning its upper squared head in the manner already described. It will be seen that the convex flange and washer received in concavities in connection with both bolts permit a slight tilting of the bar U and arms S.

The device for adjusting the parallelism of the parts of the band-knife and so preventing the working part of the band getting out of the true horizontal plane is constructed as follows: It has already been stated that the band-knife M passes over the two wheels N O. The wheel N is connected to the shaft 76 by a groove and feather $N'$, Fig. 7. Shaft 76 carries at its end the gear $Q^3$, Figs. 3, 7, 17, which engages with the pinion $Q'$, actuated by the driving-pulley Q. In this way the wheel N is rotated, and the wheel N conveys motion to the wheel O through the band-knife acting as a belt. The shaft 76 of wheel N has two bearings 77 and 78. Bearing 77, Fig. 17, has a pin 79, which extends down through the table A and is set up by the capstan-nut 80. The bearing 77 can therefore be rotated on the pin 79 as a center. Between the hub of the gear-wheel $Q^3$ and a shoulder on shaft 76 is a threaded sleeve 82, which passes loosely through the bearing 77, and on each side of said bearing is provided with capstan-nuts 83. The sleeve is prevented from turning in the bearing by a feather therein entering a spline in the sleeve, as indicated by the dotted lines in Fig. 17. It will be apparent from Fig. 17, therefore, first, that the shaft 76 can be moved in a horizontal plane around the pin 79 as a center, and, second, that by turning the capstan-nuts 83 the sleeve 82 can be caused to move longitudinally within the bearing 77, and that when so moved it acts in one direction upon the hub of gear $Q^3$ to move the shaft 76 longitudinally to the left of Fig. 17, and when moved in the other direction it operates to move said shaft to the right of Fig. 17. In this way the wheel N is of course moved laterally and with its supporting-shaft, and thus the knife M, carried by that wheel, is moved nearer to or farther from the rolls H L. This adjustment also serves to compensate for any wear due to the action of the grinding device upon the knife. It is of course to be understood that at the opposite end of the machine associated with the shaft of the knife-carrying wheel O a similar construction to that just described exists, so that both wheels N O can be simultaneously moved in the manner described.

In order to adjust the shaft 76 in a horizontal plane about pin 79 as a center, the following construction is employed, (see Figs. 3 and 18:) The bearing 78 is supported upon a vertical pin 84, which is set up by the capstan-nut 85 in the slide 86. This slide is supported upon the side frame by pins 87, provided with nuts and washers 87*, which pins pass through enlarged apertures 88 in said slide. The slide has a rib 89, which enters a groove in the supporting-bar 90 of the frame. The slide has a flange which extends alongside of the bar 90, through which passes an adjusting-screw 91, by which the slide is moved. It will be understood, therefore, that in order to change the angular position of the shaft 76 the nut 80 on the pin 79 is released, so as to permit the bearing 77 to turn on that pin as a center. The nut 85 on the pin 84 of bearing 78 is also released, leaving that bearing free to turn. Then the angular position of shaft 76 is adjusted by means of the screw 91 in the manner already described. After this the nuts 85, 87*, and 80 are tightened.

*The driving-gearing for the rolls* H L, (see Figs. 1 and 3.)—The beveled pinion $Q^2$ engages with another beveled pinion $Q^4$ on the vertical shaft $Q^5$, which is journaled in the table A. The shaft $Q^5$ passes through a standard $Q^6$, resting on the table A. The standard $Q^6$ carries an arm $Q^7$, in which is journaled one end of a shaft $Q^8$, the other end of which is journaled in the frame C. The shaft $Q^5$ at its upper end carries a beveled gear $Q^9$, which engages with a beveled pinion $Q^{10}$ on shaft $Q^8$. Shaft $Q^8$ also carries a pinion $Q^{11}$, which engages with a pinion $Q^{12}$, journaled in the depending arm $Q^{14}$ from said frame C. On the shaft of pinion $Q^{12}$ is a sprocket-wheel $Q^{15}$, dotted lines, Fig. 3, which by means of the chain belt $Q^{16}$ imparts motion to the sprocket-wheel 20 of shaft 16, Fig. 5, and said shaft 16, as already explained, through gearing 19 22, causes the rotation of the roll H. On the same shaft that carries the sprocket-wheel $Q^{15}$ is another sprocket-wheel, which by the chain belt $Q^{17}$, dotted lines, Fig. 3, engages with a sprocket-wheel $Q^{18}$ on the shaft 54 of the lower roll K and in that way actuates said roll.

*The knife-grinding devices.*—The preferable shape of knife is shown in cross-section in Fig. 1—that is to say, it has a single bevel. Inasmuch as the edge becomes dulled in use we provide means for constantly sharpening the same, which we will now describe.

V V', Figs. 1, 7, and 8, are brackets bolted on the under side of the table A. Between said brackets extends a frame $V^2$. At the lower inner portions of said brackets are inclined guide-channels $V^3$, Fig. 7, to receive ribs $V^4$ on the frame $V^5$. Said frame is supported by the screw $V^6$, which is provided with adjusting-nuts $V^7$ above and below the curved upper member of frame $V^5$. On the front side of frame $V^5$ are bolted journal-boxes $V^8$ for the shaft $V^9$, and said shaft carries an emery-wheel $V^{10}$ and driving-pulley $V^{11}$. The emery-wheel $V^{10}$ is adjusted against the edge of the blade M to grind the bevel by means of the screw $V^6$, its position then being as in Fig. 7, and it is rotated by the belt $V^{12}$ on driving-pulley $V^{11}$, which belt leads from any suitable motor. The shaft $V^9$ is threaded to receive a nut and disk $V^{13}$, between which disk and the fixed disk $V^{14}$ the emery-wheel is secured. In order to support the back of the blade and hold the edge up to the emery-wheel, a fixed table or ledge $V^{15}$ (shown broken away in Fig. 8) is provided, over which the blade travels. Through an outer flange $V^{16}$ of said table passes a screw $V^{17}$, which bears against the back of the blade, as shown in dotted lines, Fig. 7. Said screw both supports the blade and serves to adjust it toward the emery-wheel. A jam-nut $V^{18}$ is provided for holding the screw as adjusted. A steel disk W, Fig. 12, is disposed, as shown in Fig. 1, so that the knife bears against its inclined under side. Said disk is pivoted by the adjusting-screws W' in the yoke $W^2$. Said yoke is pivoted in a bearing in the upper end of post $W^3$, and said post is vertically adjustable in the fixed standard $W^4$. The yoke W is normally free to turn on its pivot. It may be clamped in position, if desired, by means of the set-screws $W^5$. The disk and yoke can be raised or lowered by raising or lowering the post $W^3$ in standard $W^4$, and said post is fastened in place as adjusted by means of the set-screws $W^6$. When the yoke $W^2$ is not clamped, the spiral spring $W^7$, attached to the upper adjusting-screw W' and to any fixed abutment, is employed for bringing the under side of the disk W with regulated steady pressure against the blade.

The object of the disk W is slightly to turn downward the extreme edge of the blade in advance of the action of the grinding-wheel $V^{10}$ upon it. This turned-over portion is ground off by wheel $V^{10}$, leaving the final edge true and straight.

*Mode of setting the knife and positively-actuated drawing-in rolls H L.*—The drawing-in rolls and knife are to be set relatively to one another and operated in the following manner: First, the rolls H L are, as described, to be positively driven in order to carry the work to the knife-edge. This excludes rolls not driven save by the friction of the hide otherwise drawn between them; nor does it mean one driven roll carrying the hide over a table, spring-plate, or loose roll. It is necessary to use two rolls, which grasp and compress the hide between them, and so positively move it forward. Second, the knife, as shown at M, Fig. 13, is to have its edge located at the place of maximum compression of the hide between the rolls and be so placed with reference to both rolls as that the two clearances between knife and rolls, respectively, shall not decrease, but always increase in transverse cross-sectional area from the point of entrance of hide between knife and roll. This is plainly shown in Fig. 13. This last result is obtained as respects one roll (here the lower roll) by placing the edge of the knife in the vertical plane of the longitudinal axis of that roll and by making the facing side of the knife not beveled, but flat. It is obtained with respect to the upper roll by displacing the axis of said roll away from the knife-edge in the following manner: Referring to Fig. 13, which is a diagram, the edge of the knife M is placed in a vertical line $x\,x'$, drawn through the center of the gage-roll L. It will be obvious, however, that if the spring-roll H were adjusted as shown at H', Fig. 13, said line $x\,x'$ would pass through the center of said spring-roll, and as a consequence there would not exist between the periphery of said roll and the beveled surface of the knife suitable clearance for the passage of the split hide, and, obviously, a constriction would be formed beyond the place of entrance of the split between roll-periphery and knife-blade. Therefore the center of the spring-roll H is displaced to the point $y$ or to such point as will cause between the periphery of said roll a sufficient amount of clearance free from constriction. It will be obvious that by this construction the expanding clearance on both sides of the knife is assured. On neither side is the hide retarded by any constriction. The positively-acting rolls do not force the splits through constricted clearances, but move the hide positively and regularly against the knife-edge. After that edge does its work the resistance to the movement of the hide (by reason of the expanding clearances) never increases, but always diminishes.

The operation of the machine is as follows: The hide being wound in the manner already described upon the beam P is introduced between the rolls H and L. These, being rotated by the means already explained, bring the advancing edge of the hide against the traveling edge of the band-knife M, which splits the hide, as indicated in Fig. 10, one split passing above and the other below the knife.

We claim—

1. In a leather-splitting machine, two drawing-in rolls, means for positively actuating both of said rolls to move the work to the knife-edge and a knife having one side beveled to form an edge with its opposite flat side; one of said rolls being placed with its axis in the same vertical plane as the knife-edge and below the flat side of the knife and the other roll being placed wholly above said knife-edge with its axis displaced from said vertical plane and in a direction away from said knife, substantially as described.

2. In a leather-splitting machine, two parallel superposed drawing-in rolls, means for positively actuating said rolls to move the work to the knife-edge, a knife between said rolls, a supporting-frame for the upper roll, means for bodily and positively raising and lowering said frame and means for raising and lowering said roll in said frame, substantially as described.

3. In a leather-splitting machine two parallel superposed drawing-in rolls, means for positively actuating said rolls to move the work to the knife-edge, a knife between said rolls, a swinging frame supporting the upper roll, suspended at its ends and means for raising and lowering said frame without moving said frame on its suspension devices, substantially as described.

4. In a leather-splitting machine, two parallel superposed drawing-in rolls, means for positively actuating said rolls to move the work to the knife-edge and a knife between said rolls, the upper roll being suspended from above its axis of rotation, and means for adjusting said upper roll in both directions laterally on its axis of suspension, substantially as described.

5. In a leather-splitting machine, two parallel superposed drawing-in rolls, means for positively actuating said rolls to move the work to the knife-edge and a knife between said rolls, one of said rolls being suspended from above its axis of rotation and the other of said rolls being supported on an axis disposed below its axis of rotation, means for adjusting the upper roll in both directions laterally on its axis of suspension, and means for adjusting the lower roll in both directions laterally on its axis of support, substantially as described.

6. In a leather-splitting machine, two parallel superposed drawing-in rolls, means for positively actuating said rolls to move the work to the knife-edge and a knife between said rolls, a suspended frame on which said upper roll is journaled below the axis of suspension, and means for adjusting said lower roll on both sides of a vertical plane passing through said axis of suspension, substantially as described.

7. In a leather-splitting machine, two parallel superposed drawing-in rolls, means for positively actuating said rolls to move the work to the knife-edge, a knife between said rolls and a frame in which said lower roll is journaled, the said frame being supported upon an axis parallel to and below the axis of rotation of said lower roll, and means for adjusting said frame laterally on both sides of a vertical plane passing through its axis of support, substantially as described.

8. In a leather-splitting machine, two parallel superposed rolls, a knife between them, a frame supporting the lower roll, and itself supported on end journals, and means for raising and lowering said journals, substantially as described.

9. In a leather-splitting machine, two parallel superposed drawing-in rolls, means for positively actuating said rolls to move the work to the knife-edge, a knife between said rolls and means for vertically and laterally adjusting said rolls, substantially as described.

10. In a leather-splitting machine, two parallel superposed drawing-in rolls, means for positively actuating said rolls to move the work to the knife-edge, a knife between said rolls and means for swinging said rolls to adjust them over arcs convex to one another and above and below said knife, substantially as described.

11. In a leather-splitting machine, a frame, a roll supported in said frame and means for applying transverse strain to said roll in either of two relatively opposite directions and at a plurality of points along its length, substantially as described.

12. In a leather-splitting machine, two parallel superposed drawing-in rolls, means for positively actuating said rolls to move the work to the knife-edge, a knife between said rolls, and devices grasping one of said rolls at a plurality of points along its length, substantially as described.

13. The combination in a leather-splitting machine of the fixed frames C, D having trunnion-seats, bars 3 having trunnions E, F received in said seats, screws 6 supported by said bars, frame G supported by said screws and roll H supported by said frame, substantially as described.

14. The combination in a leather-splitting machine of the fixed frames C, D having trunnion-seats, bars 3 having trunnions E, F received in said seats, screws 6 supported by said bars, blocks 8 having recesses 14 supported by said screws, frame G attached to said blocks, bearings 15 movably held in said recesses and roll H supported in said bearings, substantially as described.

15. The combination in a leather-splitting machine of the vertically-adjustable blocks 8 having recesses 14 in their lower ends, bearings 15 in said recesses, means for vertically adjusting said bearings and roll H supported in said bearings, substantially as described.

16. In a leather-splitting machine, two parallel superposed drawing-in rolls, means for positively actuating said rolls to move the work to the knife-edge, a knife between said rolls, a swinging frame carrying one of said rolls, and means for bodily raising and lowering said frame independently of the swinging movement of said frame, substantially as described.

17. In a leather-splitting machine, two parallel superposed drawing-in rolls, means for positively actuating said rolls to move the work to the knife-edge, a knife between said rolls, swinging frames respectively carrying said rolls, and means for adjusting the several frames in swung position on both sides of a vertical plane and tangent to the edge of the knife.

18. The combination in a leather-splitting machine of a swinging frame, a roll H carried thereby, below the axis of suspension of said frame, and means for adjusting said roll nearer to or farther from said frame, substantially as described.

19. The combination in a leather-splitting machine of the side frames C, D, having yoked upper portions, adjusting-screws 12, 13 passing through said yokes, a frame G suspended in said side frames, a roll H carried by said frame G and a projection 11 connected to said frame G and interposed between said screws 12, 13, substantially as described.

20. In a leather-splitting machine, a frame G, a roll H carried thereby, a plurality of supports on said roll carried by said frame and positively grasping said roll at points along its length, and means for independently adjusting each of said supports in relatively opposite directions, substantially as described.

21. In combination with the frame G, a roll H supported thereby, a support positively grasping said roll at a point distant from its journals, and means in said frame for actuating said support to carry the grasped portions of said roll nearer to or farther from said frame, substantially as described.

22. The combination in a leather-splitting machine with the frame G and the roll H carried by said frame, of a support positively grasping said roll, a threaded rod 29 carrying said support, an elastic cushion for said rod, and nuts on said threaded rod for moving the same and thereby adjusting said support with respect to said roll, substantially as described.

23. The combination in a leather-splitting machine of a frame G, a roll H carried by said frame, adjustable rod 29 in said frame, a presser-block carried by said rod and formed in two parts 34, 35 having a concavity receiving said roll, and means for adjusting said parts with reference to one another, substantially as described.

24. The combination in a leather-splitting machine of the standards I, J, vertically-movable journal-boxes 44, supported in said standards, frame K having its journals in said boxes, and gage-roll L carried by said frame, substantially as described.

25. The combination in a leather-splitting machine, of the table A, standards I, J therein vertically-movable journal-boxes 44 in said standards, screws 46 beneath said journal-boxes, nuts 47 on said screws, means for rotating said nuts to elevate and depress said boxes, gage-roll L and frame K supporting said roll and journaled in said boxes, substantially as described.

26. The combination in a leather-splitting machine, of a frame K and a gage-roll L supported thereby, the said frame being supported on journals located at its ends and below its equilibrate longitudinal axis, substantially as described.

27. The combination in a leather-splitting machine of a frame K supported on end journals below its equilibrate axis, a gage-roll L carried by said frame above said equilibrate axis and means for adjusting said frame in swung position on its journals, substantially as described.

28. The combination in a leather-splitting machine, of a swinging frame K, a gage-roll L journaled on the upper side thereof, fixed frames C, D having recesses C' to receive the journal-bearings of said roll and adjusting-screws 57 supported in said fixed frames and regulating the position of said journal-bearings, substantially as described.

29. The combination in a leather-splitting machine of a frame K, gage-roll L journaled in said frame, carriers 58 having rolls 59, 60 disposed in said frame and below said roll L, and means for adjusting said carrier and rolls to bear against said roll L, substantially as described.

30. The combination in a leather-splitting machine, of a frame K having trough K', gage-roll L journaled in said frame above said trough, carriers 58 having rolls 59, 60 disposed in said trough with said rolls bearing against the under side of roll L, and screws 61, 62 passing through said frame and serving to adjust the pressure of said carrier-rolls 59, 60 against said roll L, substantially as described.

31. The combination in a leather-splitting machine, of the shaft 76, band-knife wheel N thereon, bearings 77 and 78 for said shaft, threaded sleeve 82 on said shaft and passing loosely through bearing 77 and nuts 83 in proximity to said bearing 77 and engaging with said sleeve, substantially as described.

32. The combination in a leather-splitting machine with a horizontal shaft 76, band-wheel N thereon, of two bearings for said shaft, one of said bearings being rotary about a vertical pivot and the other being movable in a horizontal plane, substantially as described.

33. The combination in a leather-splitting machine with a horizontal shaft 76 and band-wheel N thereon, of the vertically-pivoted bearings 77, 78, the slide 86 carrying said bearing 78, and means for moving said slide in a direction transverse to said shaft, substantially as described.

34. The combination in a leather-splitting machine with a horizontal shaft 76 and band-wheel N thereon of the table A, the vertically-pivoted bearings 77, 78, the slide 86 carrying said bearing 78, bolts 87 securing said slide to said table, and screw 91 for moving said slide in a direction transverse to said shaft, substantially as described.

35. The combination in a leather-splitting machine of the endless band-knife M, fixed table R over which said knife passes, steadying-bar U having arms S, split screws $S^6$, $S^9$ in said table R, screw-bolts $S'$ and $S^2$ passing through said arms S and entering said split screws $S^6$ and $S^9$, convex flanges $S^3$ on said bolts, concave washers $S^4$ $S^7$ receiving said flanges, and convex washers $S^5$ and $S^8$ surrounding said bolts below said arms S and received in concavities in the upper ends of split screws $S^6$ and $S^9$, substantially as described.

In testimony whereof we have signed our names to this specification in the presence of two subscribing witnesses.

WILLIAM D. QUIGLEY.
JOSEPH H. GAY.

Witnesses:
H. R. MOLLER,
I. A. VAN WART.